(12) United States Patent
Meguro et al.

(10) Patent No.: US 8,106,950 B2
(45) Date of Patent: Jan. 31, 2012

(54) DIGITAL CAMERA

(75) Inventors: Akihiko Meguro, Yokohama (JP); Kazuya Umeyama, Tokyo (JP)

(73) Assignee: Nikon Corporation, Tokyo (JP)

( * ) Notice: Subject to any disclaimer, the term of this patent is extended or adjusted under 35 U.S.C. 154(b) by 234 days.

(21) Appl. No.: 12/310,321

(22) PCT Filed: Aug. 23, 2007

(86) PCT No.: PCT/JP2007/066370
§ 371 (c)(1),
(2), (4) Date: Feb. 20, 2009

(87) PCT Pub. No.: WO2008/023765
PCT Pub. Date: Feb. 28, 2008

(65) Prior Publication Data
US 2009/0251549 A1    Oct. 8, 2009

(30) Foreign Application Priority Data
Aug. 23, 2006   (JP) ................. 2006-226596

(51) Int. Cl.
*H04N 5/228* (2006.01)
(52) U.S. Cl. ................................ 348/208.12
(58) Field of Classification Search ............. 348/208.6, 348/208.12
See application file for complete search history.

(56) References Cited

U.S. PATENT DOCUMENTS

| | | | |
|---|---|---|---|
| 7,386,228 B2 | 6/2008 | Okada | |
| 7,590,336 B2 * | 9/2009 | Higo | 396/55 |
| 7,701,484 B2 | 4/2010 | Habe | |
| 2004/0239771 A1 * | 12/2004 | Habe | 348/208.12 |
| 2005/0219666 A1 | 10/2005 | Ejima et al. | |
| 2006/0110147 A1 | 5/2006 | Tomita et al. | |
| 2006/0140599 A1 * | 6/2006 | Nomura et al. | 396/52 |
| 2006/0256396 A1 * | 11/2006 | Ejima et al. | 358/448 |

FOREIGN PATENT DOCUMENTS

| | | |
|---|---|---|
| JP | A-03-150540 | 6/1991 |
| JP | A-2000-209484 | 7/2000 |
| JP | A-2004-205806 | 7/2004 |
| JP | A-2004-361486 | 12/2004 |
| JP | A-2006-174069 | 6/2006 |

* cited by examiner

*Primary Examiner* — Sinh Tran
*Assistant Examiner* — Jason Flohre
(74) *Attorney, Agent, or Firm* — Oliff & Berridge, PLC

(57) ABSTRACT

A digital camera includes: an image-capturing unit that captures an image of a photographic subject, and outputs the captured image; a shake amount detection unit that detects a shake amount of the digital camera; a shake correction actuation unit that is actuated for enabling a shake correction function; and a control unit that, when the shake correction actuation unit is actuated, enables an operation of a first shake correction function that sets image capture conditions of the image-capturing unit to image capture conditions in which emphasis is placed upon high sensitivity, and an operation of a second shake correction function that performs shake correction processing by performing image processing upon the image captured by the image-capturing unit, and moreover controls, based upon the shake amount detected by the shake amount detection unit, whether or not the second shake correction function, whose operation has been enabled, can be applied to the image.

12 Claims, 6 Drawing Sheets

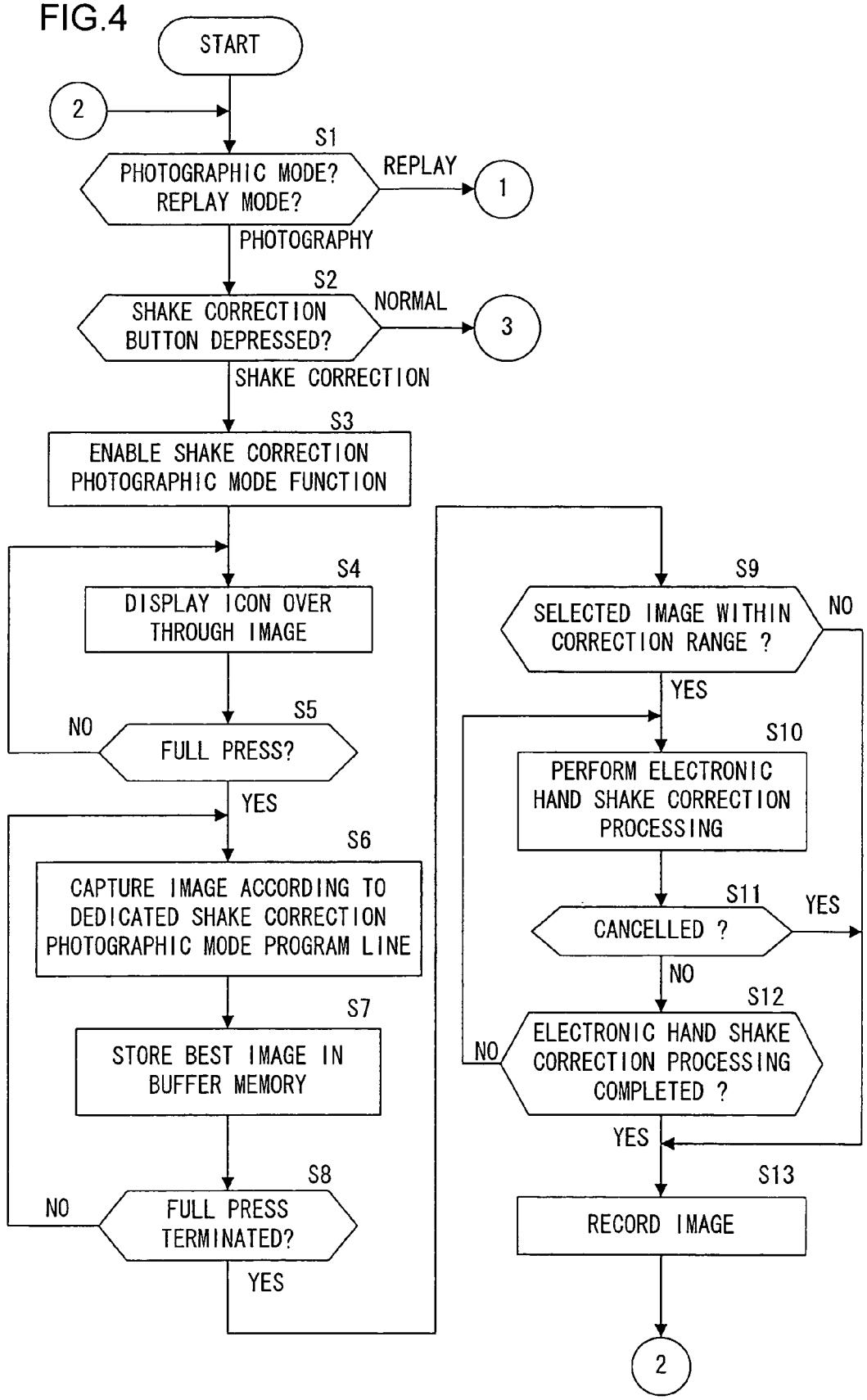

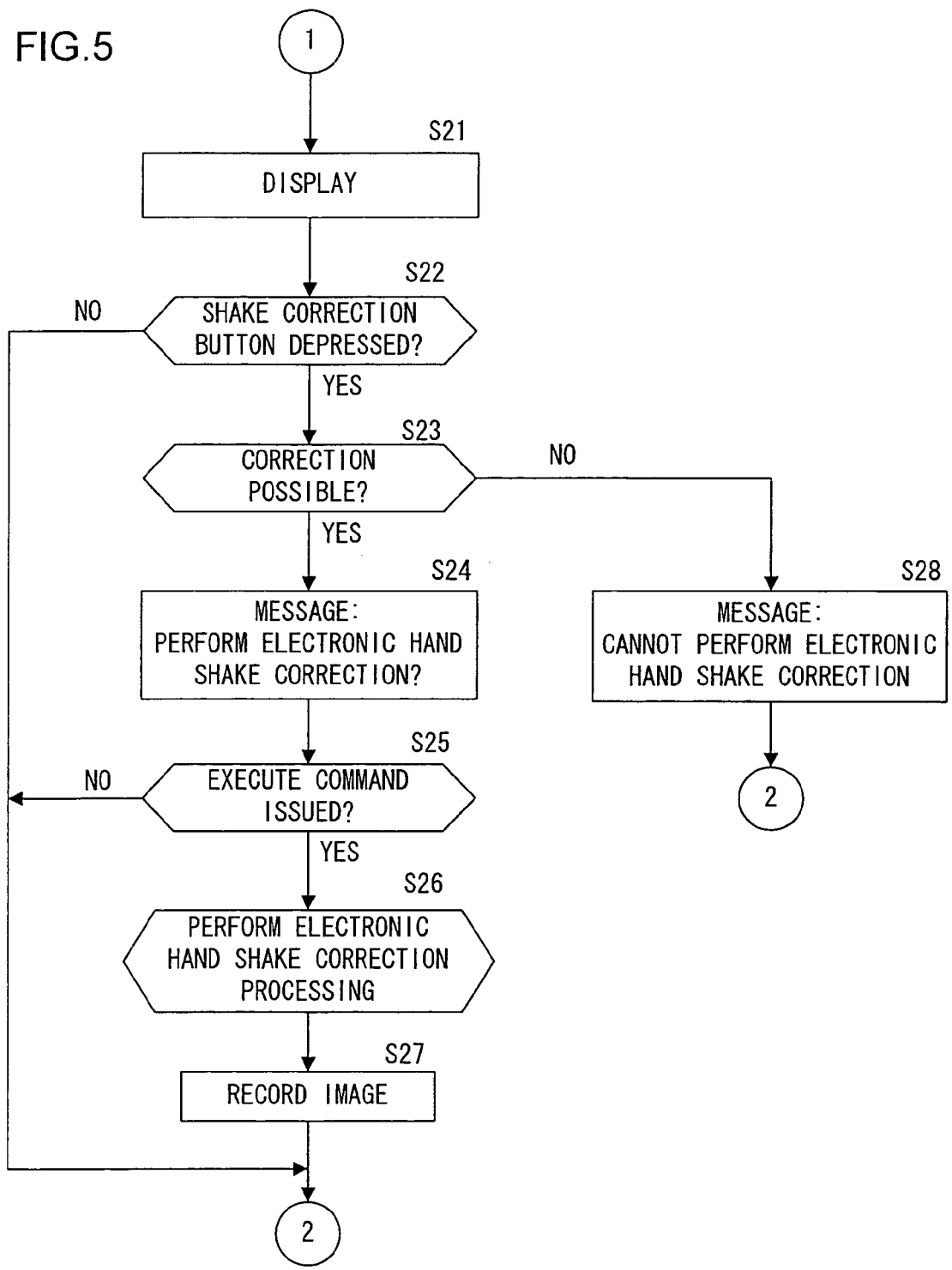

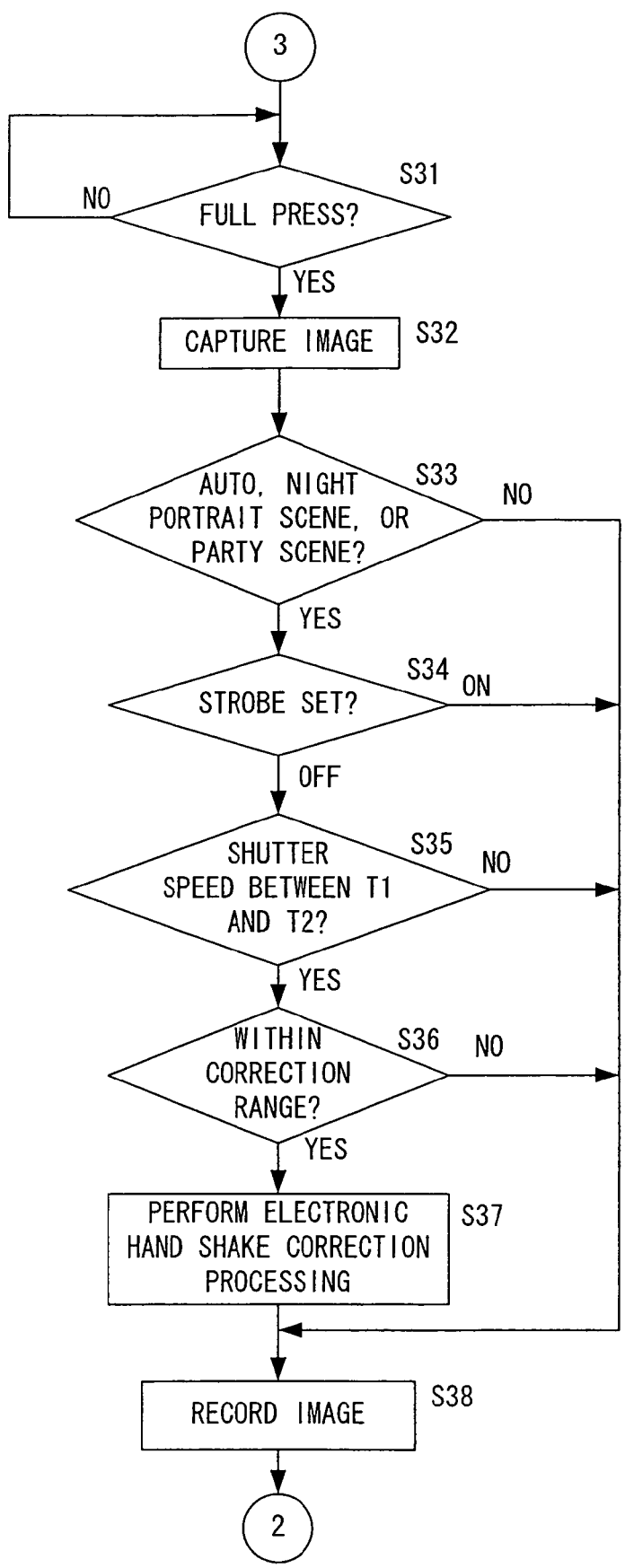

DIGITAL CAMERA

TECHNICAL FIELD

The present invention relates to a digital camera that performs shake correction in a simple and also appropriate manner.

BACKGROUND ART

In the prior art, as functions that have beneficial effects for reducing the shake of a digital camera, there are known: a function of increasing the sensitivity of the digital camera (high speed shutter); a function of selecting, from images captured in sequence, the best image in which the shake is least (see Patent Reference #1); a function of performing shake correction processing electronically (see Patent Reference #2); and so on.

Patent Reference #1: Japanese Laid-Open Patent Publication 2000-209484;

Patent Reference #2: Japanese Laid-Open Patent Publication 2004-205806.

DISCLOSURE OF THE INVENTION

Problems to be Solved by the Invention

However, since these functions are independent, it is necessary to perform the menu settings individually in order to establish the optimum settings for shake reduction. Due to this, it has been difficult for a beginner to set the functions to those that are optimum for providing the benefits of shake reduction.

Means for Solving the Problems

According to the 1st aspect of the present invention, a digital camera comprises: an image-capturing unit that captures an image of a photographic subject, and outputs the captured image; a shake amount detection unit that detects a shake amount of the digital camera; a shake correction actuation unit that is actuated for enabling a shake correction function; and a control unit that, when the shake correction actuation unit is actuated, enables an operation of a first shake correction function that sets image capture conditions of the image-capturing unit to image capture conditions in which emphasis is placed upon high sensitivity, and an operation of a second shake correction function that performs shake correction processing by performing image processing upon the image captured by the image-capturing unit, and moreover controls, based upon the shake amount detected by the shake amount detection unit, whether or not the second shake correction function, whose operation has been enabled, can be applied to the image.

According to the 2nd aspect of the present invention, in the digital camera according to the 1st aspect, it is preferred that: there is further endowed with a third shake correction function of selecting, from a series of images captured by the image-capturing unit, a best image in which blur is small; and when the shake correction actuation unit is actuated, the control unit enables the first shake correction function, the second shake correction function, and the third shake correction function.

According to the 3rd aspect of the present invention, in the digital camera according to the 2nd aspect, it is preferred that the control unit: sets, with the first shake correction function, image capture conditions of the image-capturing unit to image capture conditions in which emphasis is placed upon high sensitivity; performs image capture of the series of images and selection of a best image with the third shake correction function, using the image-capturing unit that has been set to those image capture conditions in which emphasis is placed upon high sensitivity; and performs shake correction with the second shake correction function by image processing upon the best image that has been selected in which the blur is small.

According to the 4th aspect of the present invention, in the digital camera according to the 3rd aspect, it is preferred that the control unit performs shake correction processing by image processing with the second shake correction function upon the best image in which the blur is small that has been selected by the third shake correction function, when the shake amount detected by the shake amount detection unit is greater than or equal to a first predetermined value and is less than or equal to a second predetermined value that is larger than the first predetermined value.

According to the 5th aspect of the present invention, in the digital camera according to any one of the 2nd through 4th aspects, it is preferred that when the third shake correction function is enabled, the image-capturing unit captures the series of images while a shutter release button is continuously pressed.

According to the 6th aspect of the present invention, in the digital camera according to any one of the 1st through 5th aspects, it is preferred that the shake correction actuation unit includes an actuation member that enables the shake correction functions upon being actuated once by the photographer.

Advantageous Effect of the Invention

Since the present invention has the structure described above, it becomes possible to perform shake correction in a simple and moreover appropriate manner.

BRIEF DESCRIPTION OF THE DRAWINGS

FIG. 4 is a figure showing a flow chart of a control program that is executed by a control unit 11;

FIG. 5 is a figure showing a continuation of this flow chart of the control program of FIG. 4; and FIG. 6 is a figure showing a further continuation of this flow chart of the control program of FIG. 4.

BEST MODE FOR CARRYING OUT THE INVENTION

Figure 1:
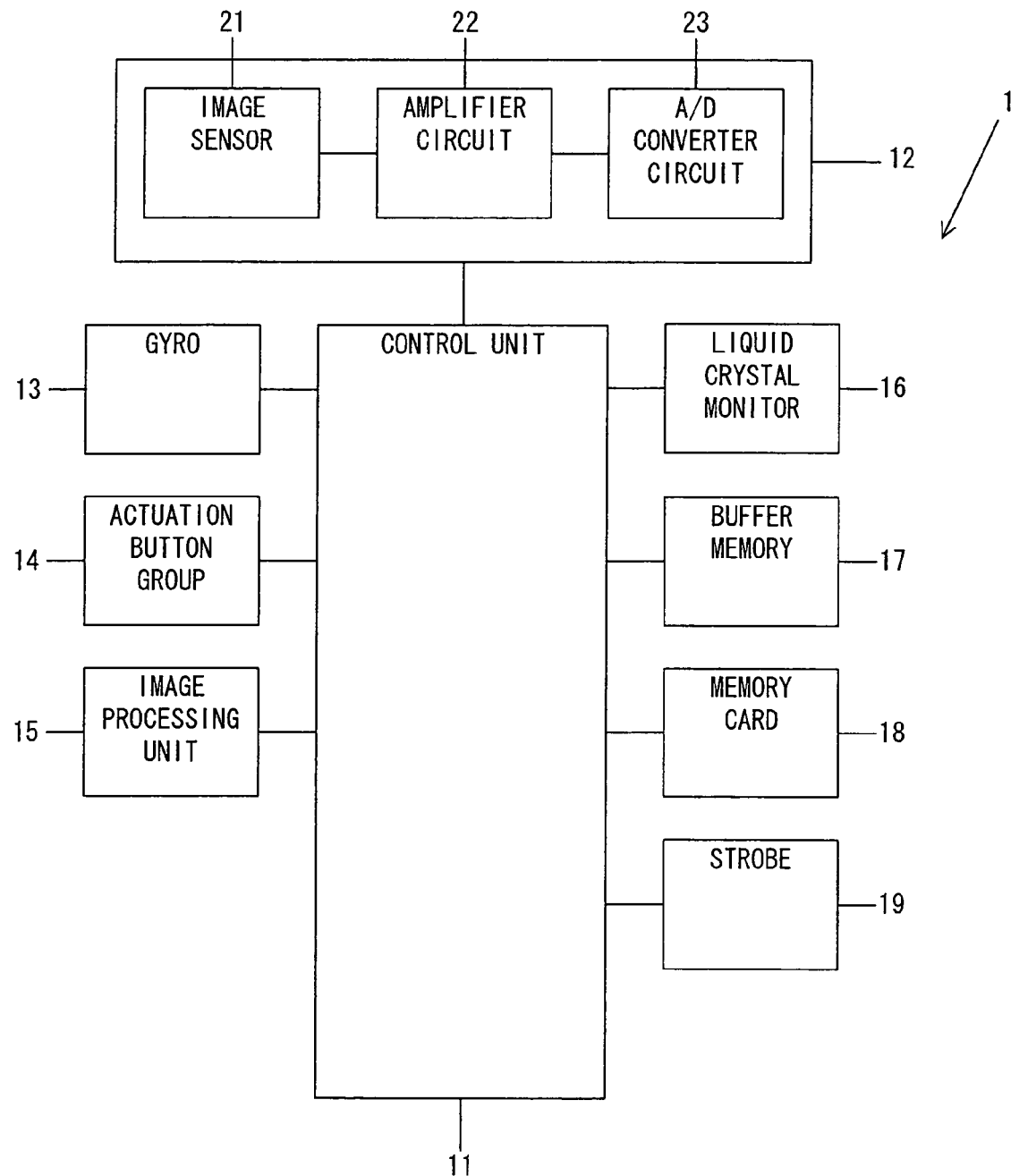
FIG. 1 is a figure showing the structure of a digital camera 1 that is an embodiment of the present invention.

FIG. 1 is a figure showing the structure of a digital camera 1 that is an embodiment of the present invention. This digital camera 1 includes a control unit 11, an image-capturing unit 12, an angular velocity sensor 13, an actuation button group 14, an image processing unit 15, a liquid crystal monitor 16, a buffer memory 17, a memory card 18, a strobe 19, and so on.

The control unit 11 consists of a micro processor and its peripheral circuitry, and performs various types of control of the digital camera 1 by executing a control program that is stored in a ROM not shown in the figures. The image-capturing unit 12 includes an image sensor 21 that consists of a CCD or the like, an amplifier circuit 22, an A/D converter circuit 23, and so on.

The image sensor 21 includes a plurality of pixels, and receives a ray bundle from a photographic subject via a photographic optical system not shown in the figures, performs photoelectric conversion, and outputs image capture signals corresponding to the various pixels. The amplifier circuit 22 amplifies the image capture signals outputted from the image sensor 21 by a predetermined amplification ratio, and outputs the results to the A/D converter circuit 23. The A/D converter circuit 23 converts these image capture signals into digital data, that it outputs. And the control unit 11 collects together the digital data corresponding to each pixel, outputted from the image capturing unit 12, into image data for a single image, that it temporarily stores in the buffer memory 17. It should be understood that, by adjusting the amplification ratio of the amplifier circuit 22, the sensitivity of the image-capturing unit 12, in other words the photographic sensitivity of the digital camera 1, may be adjusted.

This image data that has been stored in the buffer memory 17 is subjected to image processing of various types by the image processing unit 15, and may be displayed upon the liquid crystal monitor 16 or stored upon the memory card 18. The memory card 18 consists of a non-volatile flash memory or the like, and can be fitted to and detached from the digital camera 1.

Figure 2:
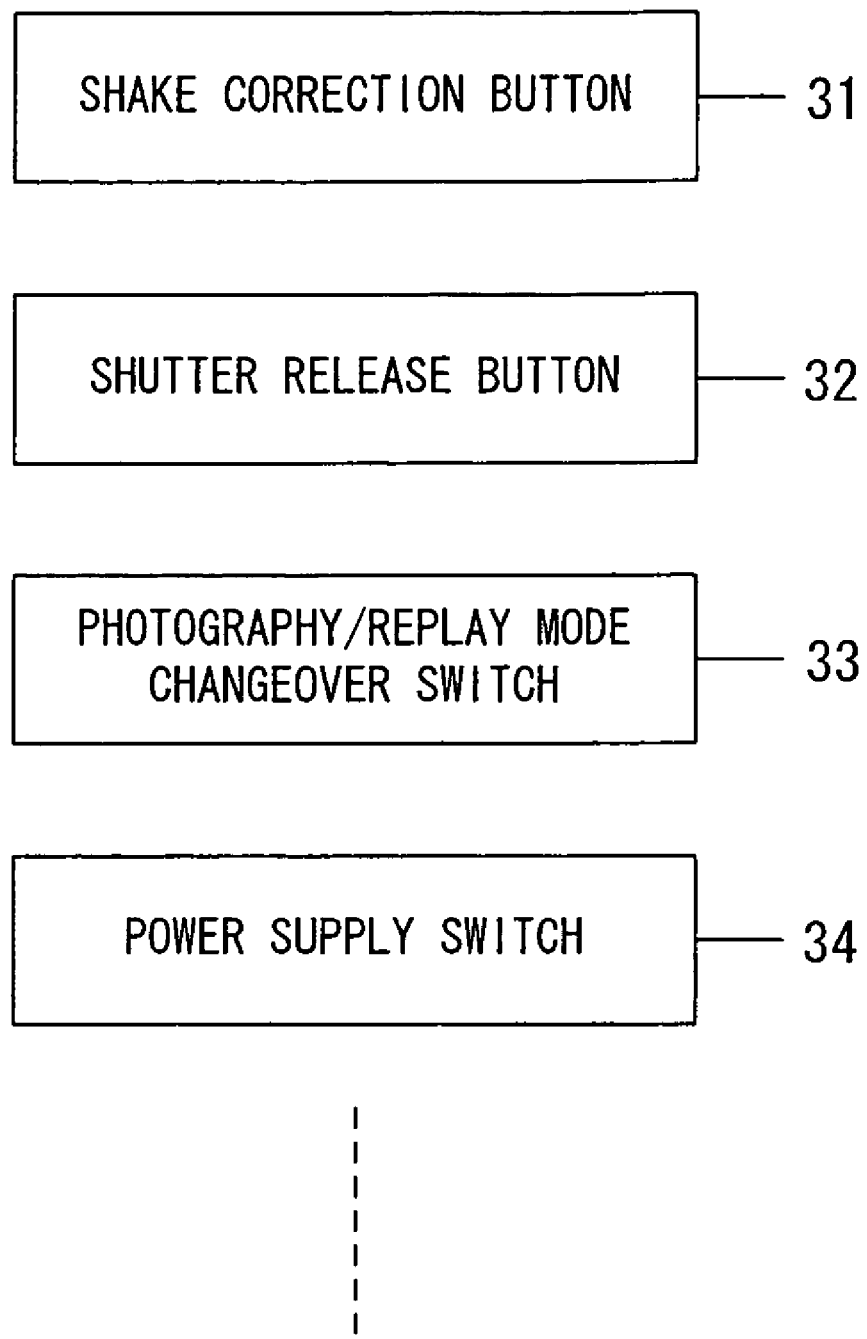
FIG. 2 is a figure showing the structure of an actuation button group 14.

The angular velocity sensor 13 is a sensor that detects the physical shake amount (the hand shaking amount) of the digital camera 1. As shown in FIG. 2, the actuation button group 14 includes actuation buttons and actuation switches of various types, such as a shake correction button 31, a shutter release button 32, a photographic/replay mode changeover switch 33, a power supply switch 34, and so on, all of which may be actuated by the photographer. The image processing unit 15 is a circuit that performs image processing of various types upon the image data captured by the image-capturing unit 12, such as interpolation, compression, white balance adjustment, and so on, and is constituted with an ASIC. Moreover, this image processing unit 15 also performs electronic shake correction processing, as will be described hereinafter. And the stroke 19 emits flash light and illuminates the photographic subject, according to the strobe setting condition and according to requirements.

The digital camera 1 of this embodiment has a photographic mode in which it captures an image of the photographic subject and records the image data having been created upon the memory card 18, and a replay mode in which it reads out image data that is recorded upon the memory card 18 and replays that data upon the liquid crystal monitor 16. By actuating the power supply switch 34 and turning the power supply of this digital camera 1 ON and OFF, and by actuating the photographic/replay mode changeover switch 33, the photographer may change over between the photographic mode and the replay mode, as appropriate.

With the digital camera 1 of this embodiment, when the shake correction button 31 is actuated during the photographic mode, the system then changes over to a shake (blur) correction photographic mode, and this camera is distinguished in which, during this shake correction photographic mode, shake countermeasures are performed by automatically enabling shake countermeasure functions of various types all at the same time. Moreover this camera is distinguished in which, in the normal photographic mode, it is arranged to perform electronic hand shake correction processing only if a predetermined condition is satisfied.

In this embodiment, the term "shaking" includes vibration of the digital camera 1 engendered when the photographer takes a photograph while holding the camera 1 by hand, in other words, hand shake (hand movement), and also includes photographic subject shake caused by the photographic subject moving. However, since photographic subject shake occurs at slower shutter speeds than hand shake, accordingly, if hand shake countermeasures are instituted, then photographic subject shake countermeasures will also be instituted. It should be understood that the phenomenon of the captured image becoming blurred due to shaking is also included under the concept of shake.

—Photographic Modes—

When the power supply is turned ON with the power supply switch 34, and the photographic mode is selected by actuation of the photographic/replay mode changeover switch 33, then, when the shake correction button 31 is actuated (i.e. is depressed), this digital camera 1 changes over to the shake correction photographic mode. And, when the shake correction button 31 is actuated during the shake correction photographic mode state, the camera changes over to the original normal photographic mode. Thus, during the photographic mode, the shake correction button 31 acts as a mode changeover button for changing over the camera between the normal photographic mode and the shake correction photographic mode.

This shake correction button 31 is a dedicated button that is provided for, during the photographic mode, changing over between the normal photographic mode and the shake correction photographic mode, and, by the use thereof, the photographer can perform changing over between the normal photographic mode and the shake correction photographic mode by a single actuation ("one-touch"). In other words, the shake correction button 31 is an actuation member with which, by actuating it once, the photographer can immediately change over to the shake correction photographic mode. It should be understood that this shake correction button 31 could also be a switch of some other type. For example, a slide type switch could also be employed. In other words, any form for this shake correction button would be acceptable, provided that it is a switch with which, by the photographer actuating it one time only, it is possible to command changing over between the normal photographic mode and the shake correction photographic mode to be performed.

When the camera changes over to the shake correction photographic mode, the control unit 11 automatically sets the following functions, and enables all of these functions simultaneously:

(1) increase of sensitivity (a program line specific to the shake correction photographic mode that gives priority to increase of the sensitivity)

(2) a best shot selector (BSS) function;

(3) electronic hand shake correction.

—Increase of Sensitivity (Using a Program Line Specific to the Shake Correction Photographic Mode)—

Figure 3:
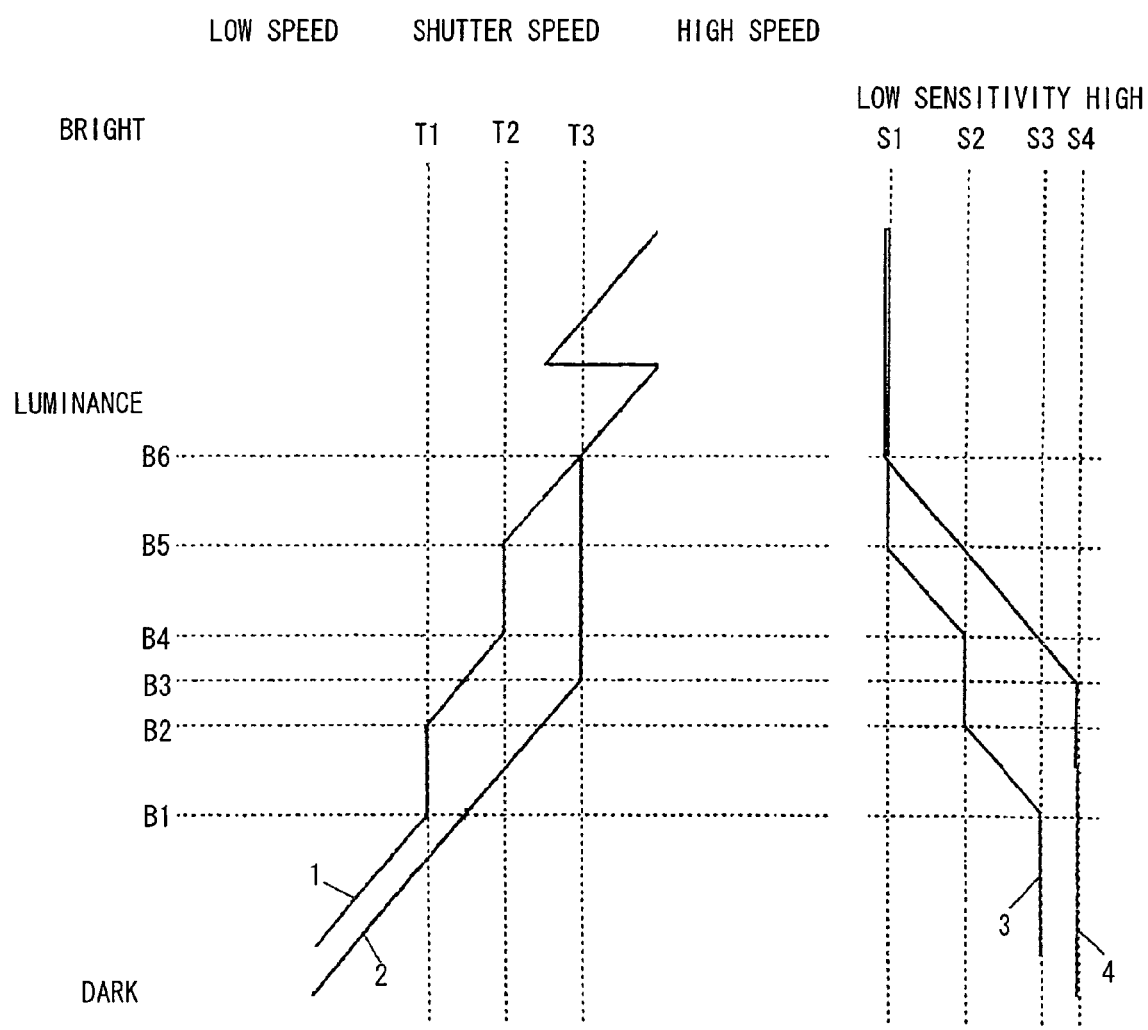
FIG. 3 is a figure showing program lines that are used in a normal photographic mode and a shake correction photographic mode.

FIG. 3 is a figure showing program lines (a program chart) that are used in the normal photographic mode and the shake correction photographic mode. FIG. 3(*a*) shows the relationship between luminance and shutter speed (timing), and a program line #1 is used for the normal photographic mode, while a program line #2 is used for the shake correction photographic mode. And FIG. 3(*b*) shows the relationship between luminance and sensitivity, and a program line #3 is used for the normal photographic mode, while a program line #4 is used for the shake correction photographic mode. The luminance is shown along the vertical axis, with brighter being upwards in the figure and darker being downwards in the figure. In FIG. 3(a), the shutter speed is shown along the horizontal axis, with higher speed being rightwards in the figure and lower speed being leftwards in the figure. And, in FIG. 3(b), the sensitivity is shown along the horizontal axis, with higher sensitivity being rightwards in the figure and lower sensitivity being leftwards in the figure.

As shown in FIG. 3, in the program lines #2 and #4 that are dedicated to the shake correction photographic mode, an increase of sensitivity and an increase of shutter speed are implemented from high luminance, as compared with the program lines #1 and #3 for the normal photographic mode. In other words, the photographic conditions are set while giving emphasis to high sensitivity. Increase of the sensitivity of the digital camera 1 is implemented by increasing the amplification ratio of the amplifier circuit 22 of the image-capturing unit 12.

In FIG. 3, in the normal photographic mode, along with reduction of the luminance from the luminance value B5 to the luminance value B4, while the shutter speed is kept at T2, the sensitivity is increased from S1 to S2 in correspondence to the luminance value. Next, from the luminance value B4 to the luminance value B2, while the sensitivity is kept at S2, the shutter speed is reduced from T2 to T1 in correspondence to the luminance value. Next, from the luminance value B2 to the luminance value B1, while the shutter speed is kept at T1, the sensitivity is increased from S2 to S3 in correspondence to the luminance value. Next, from the luminance value B1 downwards, while the sensitivity is kept at S3, the shutter speed is reduced in correspondence to the luminance value.

On the other hand, in the shake correction photographic mode, along with reduction of the luminance from the luminance value B6 that is higher than the luminance value B5 to the luminance value B3, while the shutter speed is kept at T3 that is a higher speed than T2, the sensitivity is increased from S1 to S4 in correspondence to the luminance value. Next, from the luminance value B3 downwards, while the sensitivity is kept at S4, the shutter speed is reduced in correspondence to the luminance value. It should be understood that the sensitivity S1 may, for example, correspond to ISO 100, while the sensitivity S4 may, for example, correspond to ISO 800.

By doing this, the program lines #2 and #4 for the shake correction photographic mode are, below the luminance value B6, positioned to the right side of the program lines #1 and #3 for the normal photographic mode, so that increase of sensitivity and higher shutter speeds are implemented in this shake correction photographic mode, as compared to the normal photographic mode. As a result, when the shake correction photographic mode is selected, it is possible to reduce photographic subject shake and hand shake.

It should be understood that while, depending upon the competence of the photographer, sometimes hand shake may be considerable, still the shutter speed T3 is a speed at which, generally, it can be relied upon that hand shake will not occur. The shutter speed at which it can be relied upon that hand shake will not occur is generally given in seconds by 1/the focal distance (in mm, converted to 35 mm film type). For example, in the case of a digital camera to which a photographic lens of 105 mm focal distance (converted to 35 mm film type) is mounted, the shutter speed T3 at which it can be relied upon that hand shake will not occur is 1/105 sec or 1/125 sec. In this embodiment the shutter speed T3 may be, for example, 1/125 sec.

And the shutter speed T2 is a shutter speed at which, generally, hand shake is said to occur. At lower shutter speeds than this, the possibility that hand shake will occur becomes great. In this embodiment the shutter speed T2 may be, for example, 1/60 sec. And the shutter speed T1 is a shutter speed at which, generally, photographic subject shake takes place. At lower shutter speeds than this, the possibility that photographic subject shake will occur becomes great. In this embodiment the shutter speed T1 may be, for example, 1/2 sec.

In the shake correction photographic mode, the increase of the sensitivity is started at the time point of the shutter speed T3 at which it can be relied upon that hand shake will not occur, and hand shake countermeasures can be more reliably contemplated than in the normal photographic mode.

It should be understood that, in the normal photographic mode, from the luminance value B2 to the value B1, the sensitivity is increased from S2 to S3 while keeping the shutter speed at T1. Due to this, in the normal photographic mode, a reduction of the photographic subject shake due to increase of the sensitivity may be anticipated.

—The Best Shot Selector (BSS) Function—

The best shot selector function is a function of, while the shutter release button 32 is pressed, for each frame that is photographed, selecting that image for which the amount of hand shake is less than that of the previous file that is recorded in the buffer memory 17, and then recording upon the memory card 18 only that image for which, after the decision for the final frame, the amount of hand shake is the smallest. In other words, this best shot selector function is a shake correction function in which, from a plurality of images in series that are captured by the image-capturing unit 12, the best image in which the shake (blur) is lowest is selected.

In the shake correction photographic mode, the best shot selector function is automatically enabled, and the best shot selector function is performed for an image that is photographed upon the program line dedicated to the shake correction photographic mode. Due to this, it is possible to record an image in which, in addition to increase of the sensitivity, the shake (blur) is low.

The decision as to the amount of shake (blur) for execution of the best shot selector function, is performed according to the size of the image file of the image data after compression. It is decided that images whose image data file size is large are images in which the shake (blur) is low. This is because, the less is the shake (blur), the greater the relative magnitudes of the edge components and the high frequency components become, and the greater the image file size after compression becomes.

Apart from this, it would also be acceptable to decide upon the magnitude of the hand shake, in other words upon the shake amount, from the shutter speed during photography, and from the output signal of the angular velocity sensor that is housed within the camera. Or, it would also be acceptable to decide upon the magnitude of the hand shake, in other words upon the shake amount, from a shake function that is calculated from the output signal of the angular velocity sensor.

—Electronic Hand Shake Correction—

Electronic hand shake correction is a function of performing hand shake correction electronically during image capture (photography) on the basis of hand shake information; in concrete terms, it is a function of performing hand shake correction by image processing. In other words, the shake amount of the digital camera 1 (i.e. the hand shake amount) is obtained from the output signal of the angular velocity sensor 13, a shake function is obtained from this hand shake amount that has been obtained, and hand shake correction is performed by filter processing on this basis of this shake function that has been obtained. This electronic hand shake correction processing is performed by the image processing unit 15 under control from the control unit 11. It should be understood that, since this electronic hand shake correction processing is a per se known technique, detailed explanation thereof will be omitted. In this embodiment, any of various types of per se known electronic hand shake correction processing, in which hand shake correction is performed by image processing on the basis of hand shake information during image capture (photography), may be employed.

In the normal photographic mode, the electronic hand shake correction function is enabled when some predetermined condition is satisfied. And, in the shake correction photographic mode, the electronic hand shake correction function is unconditionally enabled. When the electronic hand shake correction function is enabled, an electronic hand shake correction icon is displayed upon the through image on the liquid crystal monitor 16. By doing this, the photographer is able to know that the electronic hand shake correction function has become enabled.

The Normal Photographic Mode

In the normal photographic mode, if the setting for electronic hand shake correction is established in the auto setting (hereinafter termed the "auto photographic mode") in which the camera is left to perform photography by itself, then, if "night portrait scene" or "party scene" is set, the electronic hand shake correction function is enabled when all of the following three conditions are satisfied. For a night portrait scene or a party scene, the possibility that this is a situation in which a person is being photographed in a dark place is high, and so, if the following conditions are satisfied, shake correction processing is automatically enabled:

(1) the strobe setting is OFF or "slow synchro";
(2) the shutter speed is between T1 and T2 described above;
(3) "single shot" shooting is being performed.

Under the above conditions, there is a high possibility that photography is being performed of a human subject in a dark location or the like, so that hand shake may well occur. The condition that the shutter speed should be between T1 and T2 is in order to perform electronic hand shake processing at shutter speeds that are between the shutter speed at which photographic subject shake occurs and the shutter speed at which hand shake occurs. To put this in another manner, if the shutter speed is one at which there is a possibility that hand shake may occur, while photographic subject shake will probably not occur, then electronic hand shake processing is performed.

Furthermore, if the shutter speed is lower than T1, then the hand shake becomes great and also photographic subject shake enters into play, so that electronic hand shake correction does not work effectively. And, if the shutter speed is higher than T2, then the influence of hand shake becomes small, so that the necessity for electronic hand shake correction processing disappears. Due to this, it is possible to prevent the execution of useless electronic hand shake correction processing, by providing the condition that the shutter speed is between T1 and T2.

The reason that the strobe setting is set to OFF or "slow synchro" is that, if the strobe is set to ON, normally the shutter speed is not lower than T2, so that there is no necessity for electronic hand shake correction processing. It should be understood that the fact that "single shot" is set as a condition is because electronic hand shake correction processing is not possible during continuous shooting, since electronic hand shake correction processing takes a certain time.

When the electronic hand shake correction function is enabled in the normal photographic mode, predetermined image processing is performed upon the image data that has been captured by the shutter release button 32 being full pressed, in order to eliminate fixed pattern noise and so on, and electronic hand shake correction processing (restoration processing with a reverse conversion filter) is performed upon the image data (the YCbCr image) before JPEG compression on the basis of the shake amount information that has been calculated from the output signal of the angular velocity sensor 13 during capture of the image. Thereafter, the image is compressed by JPEG compression, Exif file processing (header processing) is performed, and then it is recorded upon the memory card 18.

It should be understood that, in this embodiment, when performing electronic hand shake correction processing, a determination as to whether or not the electronic hand shake correction processing is actually to be performed is made on the basis of the shake amount from the angular velocity sensor 13. This is in order to ensure that this electronic hand shake correction processing is only performed in the necessary minimum level of cases, because it takes a substantial time.

First, even if the electronic hand shake correction function is enabled, if the shake amount from the angular velocity sensor 13 is less than a first predetermined value, then electronic hand shake processing is not actually performed. This first predetermined value is a value such that hand shake almost does not occur, as when the digital camera is fixed to a tripod or the like. Due to this, it is possible to prevent the execution of electronic hand shake processing undesirably taking a certain time even though hand shake is not actually occurring.

Next, even if the electronic hand shake correction function is enabled, if the shake amount from the angular velocity sensor 13 is greater than a second predetermined value, then electronic hand shake processing is not actually performed. This second predetermined value is a value that is larger than the first predetermined value, and represents the case of great shaking that cannot be corrected by the electronic hand shake correction. In this type of case as well, it is possible to prevent useless electronic hand shake correction processing being performed.

It should be understood that, instead of making this decision as to whether or not to perform correction from the shake amount, it would also be acceptable to arrange to decide on the basis of information such as the shutter speed, the focal distance, or the like. Moreover, since the probability of the occurrence of shake is decreased in the case of an image that has been captured with the strobe setting being ON, it would also be acceptable to make this decision as to whether or not to perform shake amount correction, from the strobe setting.

During the electronic hand shake correction processing, along with causing an icon of a sandglass to be displayed upon the liquid crystal monitor 16 as rotating in order to show that processing is taking place, a message "hand shake correction being performed" is also displayed. However, if the processing time is one second or less (i.e. when the image that is the subject of processing is small), then this processing under way message is not displayed.

While the message that processing is under way is being displayed, it is made possible to cancel the electronic hand shake correction processing by actuating the shake correction button 31 and the shutter release button 32. The other buttons are disabled. If the electronic hand shake processing is canceled, the image before processing is recorded upon the memory card 18. In this case, an electronic hand shake correction processing completed flag that shows whether or not electronic hand shake correction processing has been performed is set to OFF.

When the electronic hand shake correction processing has been completed, then the image after processing is recorded, while the image before processing is not recorded. In other words, there is only one recorded photographic image. This recorded image includes both the shake amount information from the angular velocity sensor 13, and also a flag that shows whether or not processing was performed. In an image after processing, the electronic hand shake correction processing completed flag is set to ON. The file name of the recorded image is set as normally, and, as normal, the last image number in sequence +1 is appended thereto. It should be understood that, even in the case of an image that was captured with the electronic hand shake correction function in the OFF state, the above described shake amount information is recorded in the image data, in order to make it possible to perform electronic hand shake correction processing during replay.

The shake correction photographic mode Next, the processing in the shake correction photographic mode will be explained. In the shake correction photographic mode, the electronic hand shake correction function is automatically enabled. When the system changes over from the shake correction photographic mode to some other photographic mode, then the electronic hand shake correction function is disabled. However, in the normal photographic mode, if the conditions described above are satisfied, then the electronic hand shake correction function is enabled.

In the shake correction photographic mode, decompression processing is performed upon the single JPEG compressed image that has been decided upon by the best shot selector function described above (i.e. upon that image that finally remains in the buffer memory 17), and electronic hand shake correction processing is performed thereupon on the basis of the shake amount information from the angular velocity sensor 13 for which image during image capture (i.e. during photography).

Even when performing electronic hand shake correction processing during the shake correction photographic mode, as explained above in connection with the normal photographic mode, whether or not actually to perform the electronic hand shake correction processing is determined on the basis of the shake amount from the angular velocity sensor 13. In other words, the electronic hand shake correction processing is only performed when the shake amount is between the first predetermined value and the second predetermined value. Moreover, the processing for performing recording upon the memory card 18 after the electronic hand shake correction processing has been performed is the same as that explained for the normal photography mode, as described above. Accordingly further explanation of these features will be omitted, and reference should be made to the explanation of the normal photographic mode in the above description.

By doing the above, and by, in the shake correction photographic mode, performing shake correction upon that image for which it has been determined by the best shot selector function that the hand shake amount is small, it is possible to record an image in which shake (blur) is minimized to a yet further extent.

—The Replay Mode—

With this digital camera 1, when the power supply is turned ON with the power supply switch 34 and the replay mode is selected by actuation of the photographic/replay mode changeover switch 33, electronic hand shake correction processing is performed upon the image that is being displayed when the shake correction button 31 is actuated (i.e. is depressed). In this replay mode, it will be supposed that a single image is being replayed. During the replay mode, the shake correction button 31 is a function execution button that performs shake correction by image processing upon the image that is being displayed. This electronic hand shake correction is performed in a similar manner to which performed during the normal photographic mode, as described above.

In order to make it explicit whether or not electronic hand shake correction can be performed upon the image that is being displayed, during single image display, a "shake correction possible" icon is displayed upon an image for which electronic hand shake correction is possible, a "shake correction not possible" icon is displayed upon an image for which electronic shake correction is not possible, and a "shake correction already performed" icon is displayed upon an image for which electronic hand shake correction has already been performed. This icon display is performed on the basis of the shake correction flag that is attached to the image.

This shake correction flag may be added when the image is captured on the basis of the shake function, and may also be added to the image after shake function calculation, when the image is first displayed during replay. Moreover, since it becomes difficult for electronic hand shake correction to be effective if the shake amount is large, accordingly whether or not electronic hand shake correction processing is actually performed is decided on the basis of the shake amount appended to the image data, in a similar manner to the way in which this is decided during the photographic mode. Moreover, it would also be acceptable to arrange to make this decision as to whether or not to perform electronic hand shake correction processing from the shutter speed or the focal distance or the like, instead of from the shake amount. Furthermore, it would also be acceptable to make this decision as to whether or not to perform electronic hand shake correction processing from the strobe setting, since the probability of the occurrence of shake is decreased in the case of an image that was captured with the strobe set to ON.

When electronic hand shake processing is performed, the image after electronic hand shake correction processing is given a different file name and constitutes a different file, and the original image is kept. The JPEG compression ratio, the resolution, and the Exif tag information are taken over from the original image. In the image after processing, the electronic hand shake processing completed flag is turned ON, and it is recorded upon the memory card 18 with a different file name.

—The Control Program—

FIG. 4 is a figure showing a flow chart for a control program executed by the control unit 11. The control program of FIG. 4 is stored in a ROM not shown in the figures, and starts when the power supply to the digital camera 1 is turned ON by the power supply switch 34 being turned ON.

In a step S1, a decision is made as to whether the photographic/replay mode changeover switch 33 is set to the photographic mode or to the replay mode. If it is set to the photographic mode then the flow of control proceeds to a step S2, whereas if it is set to the replay mode then the flow of control is transferred to a step S21 of FIG. 5.

In the step S2, a decision is made as to whether or not the shake correction button 31 is depressed. When in the normal photographic mode state the shake correction button 31 is depressed, then the flow of control proceeds to a step S3 in order to change over to the shake correction photographic mode. But when in the shake correction photographic mode state the shake correction button 31 is depressed, then the flow of control is transferred to the step S31 of FIG. 6 in order to change over to the normal photographic mode. And if in this step S2 the shake correction button 31 is not depressed, then the flow of control is transferred either to the step S3 or to the step S31 of FIG. 6, depending upon the current photographic mode.

In the step S3, for the shake correction photographic mode, the previously described three functions are enabled. In other words, the dedicated program line (increase of sensitivity) for the shake correction photographic mode is used, the best shot selector (BSS) function is turned ON, and it is arranged to perform electronic hand shake correction if the predetermined conditions are satisfied.

In a step S4, an electronic hand shake correction icon is displayed over the through image upon the liquid crystal monitor 16. And in a step S5 a decision is made as to whether or not the shutter release button 32 is full pressed. If it is full pressed then the flow of control proceeds to a step S6, whereas if it is not full pressed then the flow of control returns to the step S4 and the above described processing is repeated.

In the step S6, image capture is performed using the dedicated shake correction photographic mode program line. And in a step S7, if the image that has been captured is the first image captured with the shutter release button 32 full pressed, then it is stored just as it is in the buffer memory 17, and the flow of control proceeds to a step S8. But if the image that has been captured in the step S6 is the second or subsequent image captured from when the shutter release button 32 was full pressed, then it is compared with the best image up to the previous one, that is stored in the buffer memory 17, and the best one of these two images is overwritten into the buffer memory 17. By the best image is meant, as described above, that image in which the shake (blur) is the least.

In the step S8, a decision is made as to whether or not the full pressing of the shutter release button 32 has ended. If the full pressing has ended then the flow of control proceeds to a step S9, whereas if the full pressing has not ended then the flow of control returns to the step S6 and the processing described above is repeated.

In the step S9, a decision is made as to whether or not the best image stored in the buffer memory 17 is an image within the range of electronic hand shake correction. As previously described, on the basis of the shake amount from the angular velocity sensor 13, this is decided according to whether or not the shake amount is within a predetermined range. If it is decided that this is an image within the electronic hand shake correction range, then the flow of control proceeds to a step S10, whereas if it is decided that this is not an image within the electronic hand shake correction range, then the flow of control is transferred to a step S13.

In the step S10, as previously described, electronic hand shake correction processing is performed by the image processing unit 15 upon the image stored in the buffer memory 17, that has been selected as being the best image by the best shot selector function. And then in a step S11 a decision is made as to whether or not the shake correction button 31 or the shutter release button 32 has been depressed during this electronic hand shake correction processing, in other words as to whether or not a command has been issued to cancel the electronic hand shake correction processing. If it is decided that a cancellation command has been issued, then the flow of control is transferred to a step S13, whereas if it is decided that no cancellation command has been issued, then the flow of control proceeds to a step S12.

In the step S12, a decision is made as to whether or not the electronic hand shake correction processing has been completed. The electronic hand shake correction processing normally takes around 2 to 3 seconds, although this depends upon the size of the image. If it is decided in this step S12 that the electronic hand shake correction processing has been completed, then the image after electronic hand shake correction processing is stored in the buffer memory 17, and then the flow of control proceeds to the step S13. But if it is decided that the electronic hand shake correction processing has not yet been completed, then the flow of control returns to the step S10 and the processing described above is repeated.

In the step S13, the image that is stored in the buffer memory 17 is recorded upon the memory card 18. If the electronic hand shake correction processing ended normally, then it is the image after electronic hand shake correction processing that is stored in the buffer memory. Accordingly it is the image upon which electronic hand shake correction processing has been performed that is stored upon the memory card 18.

If in the step S9 it has been decided that the image is not within the electronic hand shake correction range, or if in the step S11 it has been decided that a cancel command for the electronic hand shake correction processing was issued, then the original image in the buffer memory 17, before electronic hand shake correction processing, is stored. In other words, the image that was selected by the best shot selector function as being the best image is stored. Accordingly, an image is stored upon the memory card 18 that has only been selected by the best shot selector, but upon which electronic hand shake processing has not been performed.

When the recording of the image upon the memory card 18 in the step S13 has been completed, the flow of control returns to the step S1 and the processing described above is repeated.

FIG. 5 is a figure showing a continuation of the flow chart of the control program of FIG. 4. If, in the step S1 of FIG. 4, it is decided that the photographic/replay mode changeover switch 33 is set to the replay mode, then the flow of control is transferred to the step S21 of FIG. 5.

In the step S21, a single image that is stored upon the memory card 18 is read out and is displayed upon the liquid crystal monitor 16. Then in a step S22 a decision is made as to whether or not the shake correction button 31 is depressed. If it is decided that the shake correction button 31 is depressed then the flow of control proceeds to a step S32, whereas if it is decided that the button 31 is not depressed then the flow of control returns to the step S1 and the processing described above is repeated. In the step S21, according to actuation of a button in the actuation button group 14 for stepping forward the replay image, the next appropriate image is read out and displayed.

In the step S23, a decision is made as to whether or not the image that is being displayed upon the liquid crystal monitor 16 is an image upon which electronic hand shake correction can be performed. For determining whether or not this is an image upon which electronic hand shake correction can be performed, it is decided whether or not the shake amount information from the angular velocity sensor 13 is sufficient, whether or not the shake amount obtained from the shake amount information described above is within the range in which electronic hand shake correction is possible, whether or not this is an image upon which electronic handshake correction processing has already been completed, whether or not this image is one of a type upon which it is not possible to perform electronic hand shake correction, such as a video image or the like, and so on. Whether or not the shake amount obtained from the shake amount information described above is within the range in which electronic hand shake correction is possible, is determined in the same manner as during the photographic mode.

If, in the step S23, it has been decided that electronic hand shake correction processing is possible, then the flow of control proceeds to a step S24, whereas if such correction processing is not possible then the flow of control is transferred to a step S28. In the step S24, a message enquiring whether or not electronic hand shake correction is to be performed ("YES/NO") is displayed upon the liquid crystal monitor 16, and then the flow of control proceeds to a step S25.

In the step S25, a decision is made as to whether or not a command for electronic hand shake processing to be performed has been issued. If, in this step S25, it is decided that a command to perform electronic hand shake correction processing has been issued via the actuation button group 14, then the flow of control proceeds to a step S26, whereas if it is decided that a command for correction processing not to be performed has been issued, then the flow of control returns to the step S1 and the processing described above is repeated.

In the step S26, electronic hand shake correction processing is performed by the processing unit 15 upon the image data for the image that is being displayed upon the liquid crystal monitor 16, in a similar manner to the case during the photographic mode. Since the image that is recorded upon the memory card 18 is one that was processed by JPEG compression, accordingly the electronic hand shake compression processing is only performed after having performed decompression processing thereupon, in a similar manner to the shake correction photographic mode in the normal photographic mode. And in the step S27, the image upon which electronic hand shake correction processing has been performed in the step S26 is recorded upon the memory card 18 as a different file from the original image. Thereafter the flow of control returns to the step S1 and the processing described above is repeated.

And, in the step S28, a message "Cannot perform electronic hand shake correction processing" is displayed for about 2 seconds. Thereafter the flow of control returns to the step S1 and the processing described above is repeated.

FIG. 6 is a figure showing a further continuation of the flow chart of the control program of FIG. 4. If, in the step S2 of FIG. 4, it is decided to proceed to the normal photographic mode, then the flow of control is transferred to the step S31 of FIG. 6. In this step S31, a decision is made as to whether or not the shutter release button 32 is full pressed. If the shutter release button 32 is full pressed then the flow of control proceeds to a step S32, whereas if it is not full pressed then the processing of the step S31 is repeated. In the step S32, an image is captured using the program line for the normal photographic mode, and this captured image is stored in the buffer memory 17.

In the step S33, a decision is made as to whether the setting for electronic hand shake correction is during the auto photographic mode, or "night portrait scene", or "party scene". If any one of these is decided upon, then the flow of control proceeds to a step S34, whereas if it is decided that none of them is the case, then the flow of control is transferred to a step S38.

In the step S34, a decision is made as to whether the strobe setting is ON or OFF. If it is decided that the strobe setting is OFF then the flow of control proceeds to a step S35, whereas if it is decided that the setting is ON then the flow of control is transferred to a step S38. In the step S35, a decision is made as to whether or not the shutter speed during capture of the captured image was within the range between T1 and T2. If it is decided that the shutter speed was within the range between T1 and T2, then the flow of control proceeds to a step S36, whereas if it is decided that the shutter speed was not within that range, then the flow of control is transferred to the step S38.

In the step S36, a decision is made as to whether or not the image that is stored in the buffer memory 17 is an image that is within the range for electronic hand shake correction prevention. As previously described, this decision is performed by deciding, on the basis of the shake amount from the angular velocity sensor 13, whether or not the shake amount is within a predetermined range. If it is decided that this is an image that is within the electronic hand shake correction range, then the flow of control proceeds to a step S37, whereas if it is decided that it is not an image that is within the electronic hand shake correction range, then the flow of control is transferred to the step S38.

In the step S37, electronic hand shake processing is performed upon the image that is stored in the buffer memory 17, and then the resulting image is overwritten into the buffer memory 17. And in the next step S38, the image that is stored in the buffer memory 17 is recorded upon the memory card 18. If electronic hand shake correction processing was performed in the step S37, then the image data after completion of the electronic hand shake correction processing is stored in the buffer memory 17, whereas, if the electronic hand shake correction processing of the step S37 was skipped, then the image data for the image that was captured in the step S32 is still stored in the buffer memory 17. Thereafter, the flow of control returns to the step S1 and the processing described above is repeated. It should be understood that, in the processing of FIG. 6, processing to produce and add the date is omitted.

According to this embodiment as explained above, the following beneficial operational effects may be obtained.

(1) In the photographic mode, when the shake correction button 31 is depressed, it is arranged to enable, automatically and simultaneously, all three functions, i.e. the increase of sensitivity (using the program line that is dedicated to the shake correction photographic mode), the best shot selector (BSS) function, and the electronic hand shake correction function. Due to this, it becomes possible to perform photography based upon the best settings for shake (blur) reduction in a simple manner, by one-touch actuation. The photographer does not need to make these menu settings individually; rather, he is able to make the best settings for shake (blur) reduction in a simple manner, even if he is a beginner.

(2) Since it is arranged to perform the shake correction functions in the order: the sensitivity increase function—the best shot selector (BSS) function—the electronic hand shake correction function, accordingly the shake correction is performed in an effective manner with good efficiency. In other words, first, the sensitivity increase function operates; then, while capturing images in the state in which the sensitivity has been increased, the best image is selected with the best shot selector function; and then, according to requirements, electronic hand shake correction processing is performed upon the best image that has been selected with the best shot selector function. Due to this, it is possible to anticipate a reduction of shake (blur) in an effective manner with good efficiency.

(3) Although the electronic hand shake correction function is enabled automatically upon depression of the shake correction button 31, it is arranged only actually to perform this shake correction function when the predetermined conditions relating to the shake amount of the digital camera 1 and so on are satisfied. Due to this, although the processing for the electronic hand shake correction processing occupies a certain time period, it is possible to prevent unnecessary electronic hand shake correction processing from being executed.

In concrete terms, it is arranged to perform electronic hand shake correction processing only if the shake amount of the digital camera is within the predetermined range. Since electronic hand shake correction processing is unnecessary if the shake amount is small, such as when the digital camera 1 is fixed upon a tripod or the like, accordingly it is possible to prevent electronic hand shake correction processing from being performed in this type of state. Moreover, if the shake amount is large, then it becomes hard for electronic hand shake correction to be effective, and also there is a possibility of inviting image deterioration (ringing). Thus, in this type of case as well, it is possible to prevent the execution of electronic hand shake correction processing that may be useless, or in which there is a possibility of image deterioration.

(4) When, during the photographic mode, the shake correction button 31 is actuated and the shutter release button 32 is pressed continuously, then a series of images is captured with the best shot selector (BSS) function. Due to this, it is possible to operate the best shot selector (BSS) function with an extremely simple actuation.

(5) In the normal photographic mode, if the setting for electronic hand shake correction processing in the auto photographic mode is made, then, if "night portrait scene" or "party scene" is set, it is arranged to enable the electronic hand shake correction function only when the predetermined conditions are satisfied. Due to this, it is possible to prevent useless electronic hand shake correction processing from being performed.

(6) In these predetermined conditions, there is included the condition that the shutter speed during image capture should be between T1 and T2. Due to this, whether or not to perform electronic hand shake correction processing is decided on the basis of the shutter speed, in an appropriate manner. In other words, since electronic hand shake correction processing is performed only in the case of a shutter speed where there is a possibility that hand shake will occur, although photographic subject shake will not occur, accordingly it is possible to prevent useless electronic hand shake correction processing from being performed.

(7) It is arranged to enable electronic hand shake correction processing automatically if the predetermined conditions are satisfied for "night portrait scene" or "party scene". Due to this, when photographing a person in a dark location, hand shake correction is performed appropriately and moreover reliably.

(8) In the above described predetermined conditions, it was arranged to include that the strobe setting is OFF or "slow synchro". Thereby it is possible to prevent useless hand shake correction processing from being performed, since it is difficult for hand shake to occur if the strobe is emitting light.

Variant Embodiments (1) While, in the embodiment described above, an example was shown in which the increase of the sensitivity was performed along anticipated program lines, the present invention need not be limited to the program lines shown in FIG. 3. Some other program lines could also be used. Moreover, it would also be possible to contemplate increasing the sensitivity in some manner other than by following a program line. In other words, any function that is capable of increasing the sensitivity of the digital camera 1 would be acceptable.

(2) While, in the embodiment described above, an example was shown in which the shake amount of the digital camera 1 was detected with the angular velocity sensor 13, it would also be acceptable to arrange to detect the shake amount of the digital camera 1 with some other sensor, or by image processing.

(3) In the embodiment described above, it was arranged to perform various types of image processing with the image processing unit 15. However, it would also be acceptable to arrange for these various types of image processing to be performed by the control unit 11 itself.

(4) In the embodiment described above, it was arranged to perform the electronic hand shake correction processing, only when the predetermined conditions were satisfied. The details thereof may also be applied to a camera equipped with a shake correction device or the like of a type that possesses an optical type shake correction device that performs shake correction by physically driving the optical system, or to a camera that is equipped with an image sensor drive type shake correction device that performs shake correction by physically driving the image sensor itself, or the like. In other words, the optical type shake correction device or the image sensor drive type shake correction device is controlled to be driven, only if the conditions that were explained with reference to the embodiment described above are satisfied. Due to this, it is possible greatly to reduce the amount of electrical power that is consumed for shake correction. In the case of an optical type shake correction device, this can also be applied to a film camera, and not only to a digital camera.

(5) While, in the embodiment described above, an example was explained of a digital camera 1 that is equipped with a strobe 19, the case in which an external strobe is used may also be considered. If an external strobe is used, then it is possible for the digital camera 1 to read the ON/OFF setting of the external strobe, and moreover it is possible for it to set the ON/OFF setting of the external strobe.

Although, in the above description, various embodiments and variant embodiments have been explained, the present invention should not be considered to be limited by the details thereof. Other modes are also included within the scope of the present invention, provided that they can be considered as falling within the range of the technical concept of the present invention.

The content of the disclosure of the following application, upon which priority is claimed, is hereby incorporated herein by reference:
Japanese Patent Application 2006-226596 (filed on Aug. 23, 2006).

The invention claimed is:

1. A digital camera, comprising:
an image-capturing unit that captures an image of a photographic subject, and outputs the captured image;
a shake amount detection unit that detects a shake amount of the digital camera;
a shake correction actuation unit that is configured to be actuated for enabling a plurality of shake correction functions with a single actuation; and
a control unit that, when the shake correction actuation unit is actuated with a single actuation, enables both of an operation of a first shake correction function that sets image capture conditions of the image-capturing unit to image capture conditions in which emphasis is placed upon high sensitivity, and an operation of a second shake correction function that performs shake correction processing by performing image processing upon the image captured by the image-capturing unit, and moreover controls, based upon the shake amount detected by the shake amount detection unit, whether or not the second shake correction function, whose operation has been enabled, can be applied to the image,
wherein when the shake correction actuation unit is not actuated, the control unit enables the second shake correction function.

2. A digital camera according to claim 1, wherein:
there is further endowed with a third shake correction function of selecting, from a series of images captured by the image-capturing unit, a best image in which blur is small; and when the shake correction actuation unit is actuated with a single actuation, the control unit enables all of the first shake correction function, the second shake correction function, and the third shake correction function.

3. A digital camera according to claim 2, wherein
the control unit: sets, with the first shake correction function, image capture conditions of the image-capturing unit to image capture conditions in which emphasis is placed upon high sensitivity; performs image capture of the series of images and selection of a best image with the third shake correction function, using the image-capturing unit that has been set to those image capture conditions in which emphasis is placed upon high sensitivity; and performs shake correction with the second shake correction function by image processing upon the best image that has been selected in which the blur is small.

4. A digital camera according to claim 3, wherein
the control unit performs shake correction processing by image processing with the second shake correction function upon the best image in which the blur is small that has been selected by the third shake correction function, when the shake amount detected by the shake amount detection unit is greater than or equal to a first predetermined value and is less than or equal to a second predetermined value that is larger than the first predetermined value.

5. A digital camera according to claim 2, wherein
when the third shake correction function is enabled, the image-capturing unit captures the series of images while a shutter release button is continuously pressed.

6. A digital camera according to claim 3, wherein
when the third shake correction function is enabled, the image-capturing unit captures the series of images while a shutter release button is continuously pressed.

7. A digital camera according to claim 4, wherein
when the third shake correction function is enabled, the image-capturing unit captures the series of images while a shutter release button is continuously pressed.

8. A digital camera according to claim 2, wherein
the shake correction actuation unit includes an actuation member that enables the shake correction functions upon being actuated once by the photographer.

9. A digital camera according to claim 3, wherein
the shake correction actuation unit includes an actuation member that enables the shake correction functions upon being actuated once by the photographer.

10. A digital camera according to claim 4, wherein
the shake correction actuation unit includes an actuation member that enables the shake correction functions upon being actuated once by the photographer.

11. A digital camera according to claim 5, wherein
the shake correction actuation unit includes an actuation member that enables the shake correction functions upon being actuated once by the photographer.

12. A digital camera according to claim 1, wherein
when the shake correction actuation unit is not actuated and a predetermined condition is satisfied, the control unit enables the second shake correction function.

\* \* \* \* \*